US009276813B2

(12) United States Patent
Seibert et al.

(10) Patent No.: US 9,276,813 B2
(45) Date of Patent: Mar. 1, 2016

(54) TECHNIQUE FOR CHANGING THE OPERATING STATE OF A NODE WITHIN A NETWORK

(71) Applicant: Silver Spring Networks, Inc., Redwood City, CA (US)

(72) Inventors: Cristina Seibert, Mountain View, CA (US); William E. San Filippo, III, Los Altos Hills, CA (US); Paul Dietrich, Princeton, NJ (US); Sterling Hughes, Oakland, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 389 days.

(21) Appl. No.: 13/689,412

(22) Filed: Nov. 29, 2012

(65) Prior Publication Data

US 2013/0142083 A1 Jun. 6, 2013

Related U.S. Application Data

(60) Provisional application No. 61/566,368, filed on Dec. 2, 2011.

(51) Int. Cl.
*H04W 84/18* (2009.01)
*H04L 12/24* (2006.01)

(52) U.S. Cl.
CPC .......... *H04L 41/0813* (2013.01); *H04W 84/18* (2013.01)

(58) Field of Classification Search
CPC ... H04L 41/0813; H04L 45/02; H04W 40/24; H04W 84/18
See application file for complete search history.

(56) References Cited

U.S. PATENT DOCUMENTS

| 5,331,637 | A |  | 7/1994 | Francis et al. |  |
|---|---|---|---|---|---|
| 2004/0100394 | A1 |  | 5/2004 | Hitt |  |
| 2006/0293061 | A1 | * | 12/2006 | Kobayashi et al. | 455/455 |
| 2009/0168678 | A1 | * | 7/2009 | Han et al. | 370/311 |
| 2010/0191848 | A1 | * | 7/2010 | Fujita et al. | 709/224 |

FOREIGN PATENT DOCUMENTS

WO    WO 2009063417 A1 *  5/2009  ............ H04W 52/02

OTHER PUBLICATIONS

Li Zhao et al: "SpliceNP", Architecture for Networking and Communications Systems, 2005. ANCS 2005. Symposium on, IEEE, Piscataway, NJ, USA, Oct. 26, 2005, pp. 135-143, XP031362756, ISBN: 978-1-59593-082-8.

(Continued)

*Primary Examiner* — Paul H Masur
(74) *Attorney, Agent, or Firm* — Artegis Law Group, LLP

(57) ABSTRACT

A node residing within a wireless mesh network is configured to transmit a state transition message to a downstream node also residing within the wireless mesh network. The state transition message indicates a new operating state for the downstream node. Upon receipt of the state transition message, the downstream node may transition to the new operating state and then transmit an acknowledgement message back to the node that sent the state transition message. Alternatively, the downstream node may transmit the acknowledgement message back to the node that sent the state transition message first, and then transition to the new operating state.

19 Claims, 6 Drawing Sheets

(56) References Cited

OTHER PUBLICATIONS

Rong Zheng et al: "MAC layer support for group communication in wireless sensor networks", Mobile Adhoc and Sensor Systems Conference, 2005. IEEE International Conference on Nov. 7, 2005, Piscataway, NJ, USA,IEEE, Nov. 7, 2005, pp. 388-395, XP010858895, 001: 10.11 09/MAHSS.2005.1542824 ISBN: 978-0-7803-9465-0.

European Search report for Application No. 12 195 289.9, dated Jun. 7, 2013.

* cited by examiner

TECHNIQUE FOR CHANGING THE OPERATING STATE OF A NODE WITHIN A NETWORK

CROSS-REFERENCE TO RELATED APPLICATIONS

This application claims the benefit of United States provisional patent application titled "State Change," filed on Dec. 2, 2011 and having Ser. No. 61/566,368.

BACKGROUND OF THE INVENTION

1. Field of the Invention

Embodiments of the present invention relate generally to wireless digital communication and, more specifically, to a technique for changing the operating state of a node within a network.

2. Description of the Related Art

A conventional wireless mesh network includes a plurality of nodes configured to communicate with one another. Each such node typically communicates with other nodes in the network according to a particular operating state. The operating state of a given node could include the signaling range, the carrier frequency, the band, or other parameters associated with wireless communication.

At times, different nodes within the network may operate according to different operating states. This situation could occur because some of the nodes transitioned to a new operating state while other nodes did not transition to the new operating state. The problem with this situation is that nodes operating according to different operating states may not be able to communicate with one another. When nodes in the network cannot communicate with one another, data communication across the network could be significantly impeded and the overall throughput of the network reduced.

As the foregoing illustrates, what is needed in the art is an effective technique for managing the operating states of nodes within a network.

SUMMARY OF THE INVENTION

One embodiment of the present invention sets forth a computer-implemented method for causing a first node residing within a network to transition from a first operating state to a second operating state, including receiving a first state transition message from a second node that is coupled to the first node and also resides within the network, wherein the state transition message indicates the second operating state, determining that the first state transition message indicates a first sequence with which the first node should transition from the first operating state to the second operating state and transmit a first acknowledgement message to the second node, causing the first node to transition from the first operating state to the second operating state based on a first set of operating parameters included within the first state transition message, and transmitting the first acknowledgement message to the second node indicating that the first state transition message was received by the first node according to the first sequence.

One advantage of the disclosed technique is that nodes within the wireless mesh network are capable of synchronizing operating states amongst one another, thereby providing more reliable and robust communication pathways across the wireless mesh network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
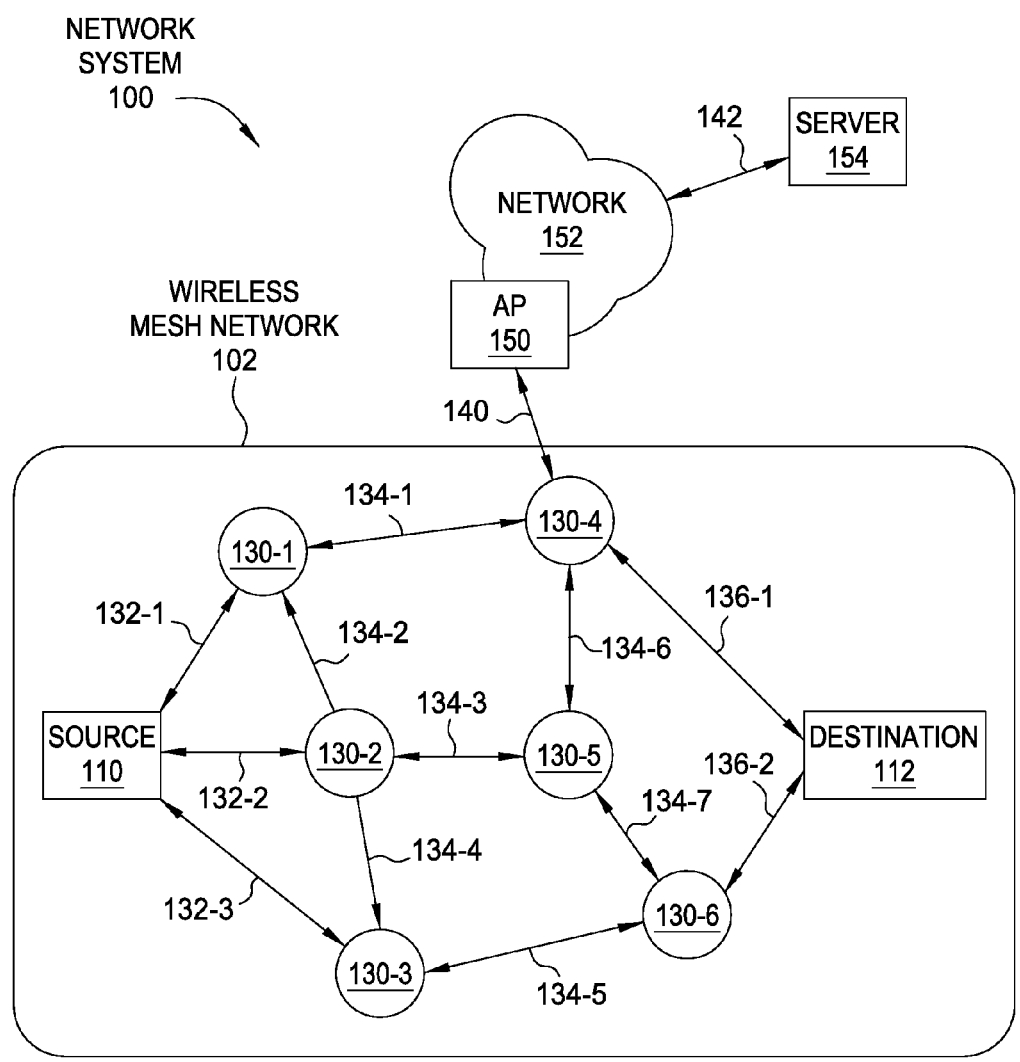
FIG. 1 illustrates a network system configured to implement one or more aspects of the invention.

FIG. 1 illustrates a network system 100 configured to implement one or more aspects of the invention. As shown, the network system 100 includes a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing from the scope and spirit of embodiments of the present invention.

The discovery protocol may also be implemented to determine the hopping sequences of adjacent nodes, i.e. the sequence of channels across which nodes periodically receive payload data. Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address, and each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

In network system 100, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 is coupled to the server 154 via communications link 142. The access point 150 is coupled to the network 152, which may comprise any wired, optical, wireless, or hybrid network configured to transmit payload data between the access point 150 and the server 154.

In one embodiment, the server 154 represents a destination for payload data originating within the wireless mesh network 102 and a source of payload data destined for one or more nodes within the wireless mesh network 102. In one embodiment, the server 154 executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

The techniques described herein are sufficiently flexible to be utilized within any technically feasible network environment including, without limitation, a wide-area network (WAN) or a local-area network (LAN). Moreover, multiple network types may exist within a given network system 100. For example, communications between two nodes 130 or between a node 130 and the corresponding access point 150 may be via a radio-frequency local-area network (RF LAN), while communications between access points 150 and the network may be via a WAN such as a general packet radio service (GPRS). As mentioned above, each node within wireless mesh network 102 includes a network interface that enables the node to communicate wirelessly with other nodes. Each node 130 may implement the first and/or second embodiments of the invention, as described above, by operation of the network interface. An exemplary network interface is described below in conjunction with FIG. 2.

Figure 2:
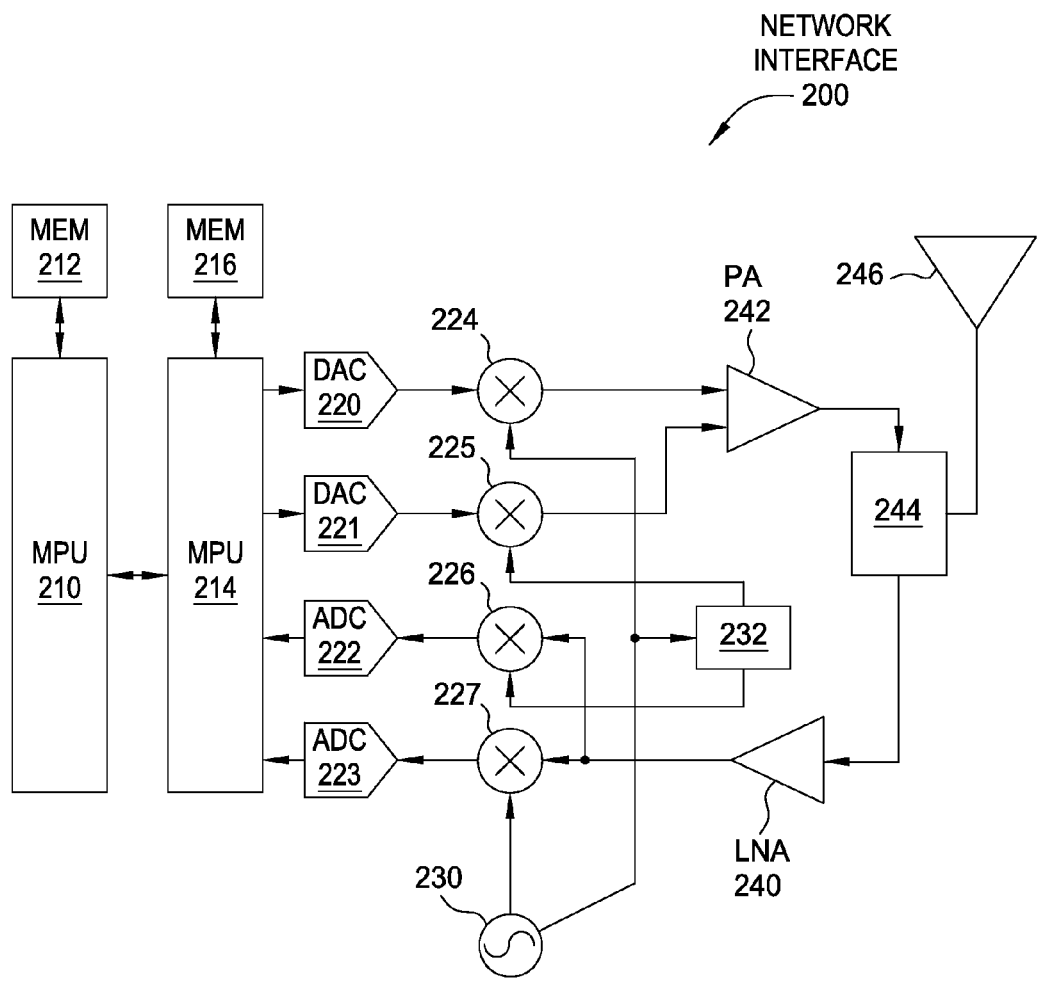
FIG. 2 illustrates a network interface configured to transmit and receive data within a mesh network, according to one embodiment of the invention.

FIG. 2 illustrates a network interface 200 configured to implement multi-channel operation, according to one embodiment of the invention. Each node 110, 112, 130 within the wireless mesh network 102 of FIG. 1 includes at least one instance of the network interface 200. The network interface 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage. Memory 212 and/or memory 216 may be used to store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node, as described in conjunction with FIGS. 1 and 3-7, when MPU 210 executes a firmware program stored in memory within network interface 200.

The MPU 214 is coupled to DAC 220 and DAC 221. Each DAC 220, 221 is configured to convert a stream of outbound digital values into a corresponding analog signal. The outbound digital values are computed by the signal processing procedures for modulating one or more channels. The MPU 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values. Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Referring back now to FIG. 1, each node 130 within wireless mesh network 102 is configured to communicate with other nodes 130 according to a particular operating state. The operating state of a given node 130 could reflect, for example, the physical mode, signaling range, the carrier frequency, or the band used by the given node 130 to perform wireless communications. Each node 130 is configured to communicate a new operating state to a downstream node 130, thereby causing that downstream node 130 to transition to the new operating state, as discussed in greater detail below in conjunction with FIGS. 3-4 and 5. Each node 130 is also configured to receive data indicating a new operating from an upstream node and to then transition to that new operating state, as described in greater detail below in conjunction with FIGS. 3-4 and 6.

Changing the Operating State of a Node

Figure 3:
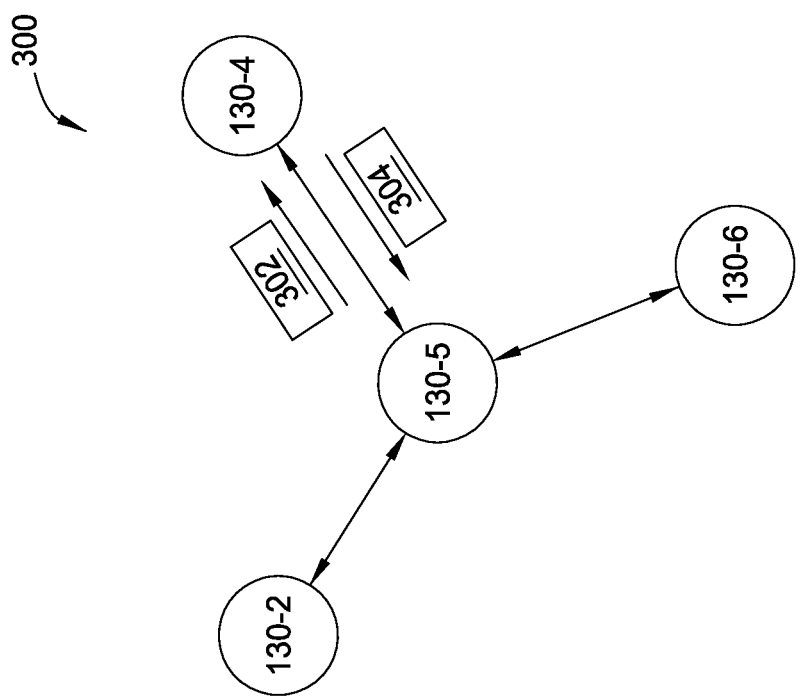
FIG. 3 is a conceptual diagram that illustrates a portion of the network system of FIG. 1, according to one embodiment of the invention.

FIG. 3 is a conceptual diagram that illustrates a portion 300 of the wireless mesh network 102 of FIG. 1, according to one embodiment of the invention. As shown, portion 300 includes nodes 130-5 coupled to nodes 130-2, 130-4, and 130-6. At certain times, nodes 130 within portion 300 may operate according to different operating states, and may thus perform wireless communications using different physical modes, signaling ranges, carrier frequencies, bands, or other parameters associated with wireless communication. These parameters are referred to hereinafter simply as "operating parameters."

A given node 130 within portion 300 is configured to determine that a downstream node 130 is operating according to a different operating state than the given node 130. In this situation, the given node 130 may transmit a "state transition message" to the downstream node 130 indicating a new operating state for that node, and may thus cause that downstream node to transition to the new operating state. The new operating state could reflect the current operating state of the given node 130.

For example, node 130-5 shown in FIG. 3 may determine that downstream node 130-4 is operating according to a different operating state than node 130-5. Node 130-5 could determine the operating state of node 130-4 based on, e.g., a neighbor table generated during the discovery process mentioned above in conjunction with FIG. 1. Node 130-5 may then transmit a state transition message 302 to node 130-4 that indicates a new operating state for the node 130-4 and may then update the neighbor table within node 130-5 to reflect that new operating state. Node 130-5 may then communicate with node 130-4 using the new operating state. In one embodiment, node 130-5 allows a "transition time" to elapse before updating the neighbor table and communicating with node 130-4 using the new operating state. The new operating state could be represented by, e.g., a set of operating parameters.

The operating parameters included within state transition message 302 may reflect the current operating state of node 130-5 or may reflect a future operating state of node 130-5. State transition message 302 included different sets of bits, where each set of bits represents a different operating parameter. A first set of bits represents an "acknowledgement message state," a second set of bits represents a physical operating mode, a third set of bits represents a frequency band, and a fourth set of bits represents a communication channel.

The first set of bits, representing the "acknowledgement message state," indicates to node 130-4 whether, upon receipt of state transition message 302, node 130-4 should transition to the new operating state and then transmit an acknowledgement message 304, or, alternatively, transmit acknowledgement message 304 first, and then transition to the new operating state. In situations where node 130-5 does not receive acknowledgement message 302 from node 130-4 within a threshold amount of time, node 130-5 may then re-transmit state transition message 302 to node 130-4. In one embodiment, upon receipt of state transition message 302, node 130-4 may transmit a message back to node 130-5 proposing a different set of operating parameters.

In one embodiment, state transition message 302 comprises a header information element (HIE) transmitted across a media access control (MAC) layer within the data link layer associated with network portion 300. In another embodiment, state transition message 302 is a MAC sub-layer management entity (MLME) payload information element (PIE). In further embodiments, state transition message 302 may be a unicast frame or a broadcast frame. In various other embodiments, node 130-5 may transmit state transition message 302 without first determining that node 130-4 is operating according to a different operating state and may not require an acknowledgement message 304.

By implementing the techniques describe above, node 130-5 is configured to synchronize operating states with one or more downstream nodes, such as node 130-4. In situations where node 130-5 operates according to a different operating state compared to one or more downstream nodes, node 130-5 is capable of causing those downstream nodes to transition to the same operating state as node 130-5. With this approach, nodes 130 within portion 300 of wireless mesh network are capable of synchronizing operating states. A given node 130 may also broadcast messages to a set of downstream nodes simultaneously, as described in greater detail below in conjunction with FIG. 4.

Figure 4:
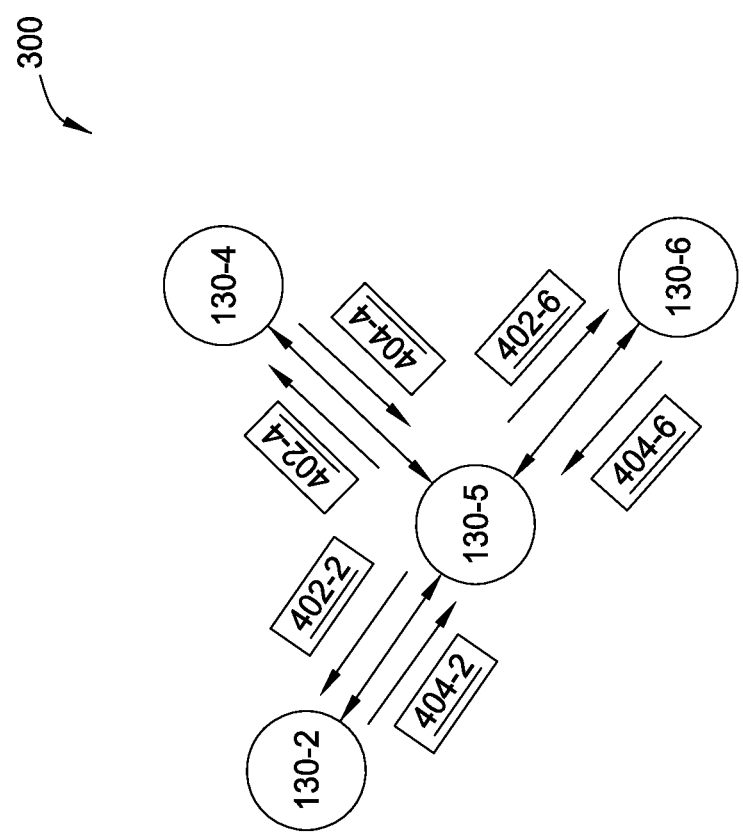
FIG. 4 is a second conceptual diagram that illustrates the portion of the network system of FIG. 1, according to another embodiment of the invention.

FIG. 4 is a second conceptual diagram that illustrates portion 300 of the wireless mesh network 102 of FIG. 1, according to another embodiment of the invention. As shown, portion 300 includes nodes 130-5 coupled to nodes 130-2, 130-4, and 130-6, similar to FIG. 3. As also shown, node 130-5 is configured to transmit state transition messages 402-2, 402-4, and 402-6 to nodes 130-2, 130-4, and 130-6, respectively. Node 130-5 may also receive acknowledgement messages 404-2, 404-4, and 404-6 in response. A given state transition message 402 represents a set of operating parameters that reflect a new operating state for a node 130 that receives the state transition message 402.

In one embodiment, each of state transition messages 402 comprises a header information element (HIE) transmitted across a media access control (MAC) layer within the data link layer associated with network portion 300. In another embodiment, each of state transition messages 402 is a MAC sub-layer management entity (MLME) payload information element (PIE). In further embodiments, a given state transition message 402 may be a unicast frame or a broadcast frame. In various other embodiments, node 130-5 may transmit a state transition message 402 to a given downstream node 130 without first determining that the downstream node is operating according to a different operating state. Node 130-5 may not require an acknowledgement message 404 in some embodiments of the present invention.

State transition message 402 could be substantially similar to state transition message 302 shown in FIG. 3, or could also include additional sets of bits that represent additional information. For example, state transition message 402 could also reflect a "change time" that indicates a time when the transition to the new operating state should be complete, and/or a "change duration" that reflects a duration of time for which node 130 that receives state transition message 402 should operate according to the new operating state.

A technique for sending a message, e.g. state transition message 302 or state transition message 402, to a downstream node 130, is discussed in greater detail below in conjunction with FIG. 5.

Figure 5:
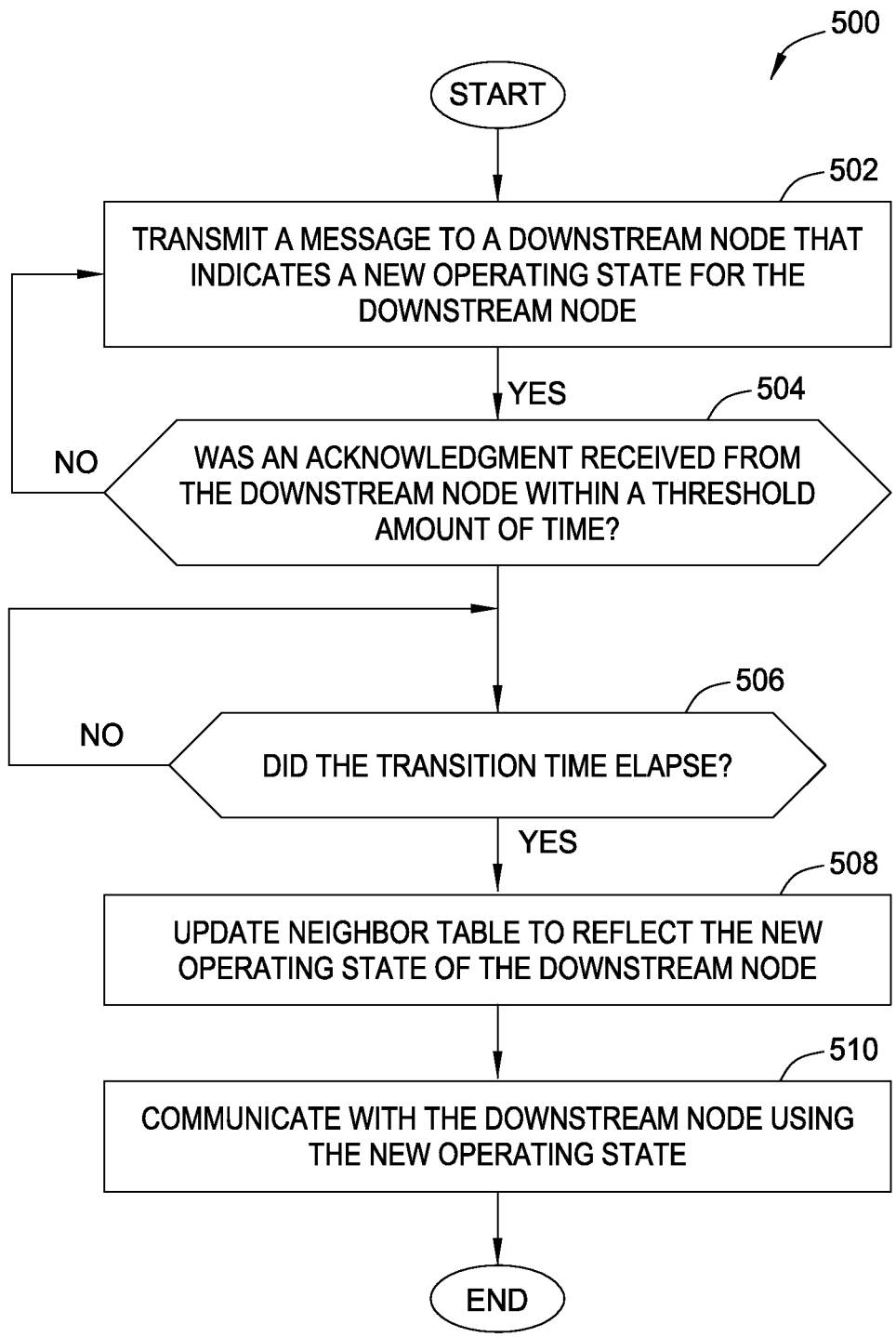
FIG. 5 is a flow diagram of method steps for transmitting a message to a downstream node that indicates a new operating state for the downstream node, according to one embodiment of the invention.

FIG. 5 is a flow diagram of method steps for transmitting a state transition message (302 or 402) to a downstream node 130 that indicates a new operating state for the downstream node 130, according to one embodiment of the invention. Although the method steps are described in conjunction with the systems of FIGS. 1-4, persons skilled in the art will understand that any system configured to perform the method steps, in any order, is within the scope of the present invention.

As shown, a method 500 begins at step 502, where node 130-5 transmits a state transition message to node 130-4 that indicates a new operating state for node 130-4. The state transition message could be, e.g., state transition message 302 shown in FIG. 3 or state transition message 402-4 shown in FIG. 4. The state transition message includes a set of operating parameters that represent the new operating state.

At step 504, node 130-5 determines whether an acknowledgement message was received from node 130-4 within a threshold amount of time. The acknowledgement message could be, e.g., acknowledgement message 304 shown in FIG. 4. If the acknowledgement message was not received, then the method 500 returns to step 502 and proceeds a described above. Otherwise, the method 500 proceeds to step 506. In one embodiment, the method 500 may skip step 504 and proceed directly to step 506 from step 502.

At step 506, node 130-5 determines whether a transition time elapsed. The transition time reflects an amount of time required for node 130-4 to transition to the new operating state. In situations where node 130-4 transitions to the new operating state before transmitting the acknowledgement message, e.g. as indicated by the acknowledgement message state of the state transition message, the method 500 may skip step 506. If node 130-5 determines that the transition time did not elapse, the method repeats step 506. Once node 130-5 determines that the transition time has elapsed, the method 500 proceeds to step 508.

At step 508, node 130-5 updates a neighbor table to reflect the new operating state of node 130-4. The operating table indicates the operating states of nodes 130 residing adjacent to node 130-5. In one embodiment, node 130-5 repeats the discovery process outlined in conjunction with FIG. 1 in order to update the neighbor table. At step 508, node 130-5 communicates with node 130-4 using the new operating state. The method 500 then ends.

Persons skilled in the art will understand that any node 130 within wireless mesh network 102 may perform the method 500 in order to transmit a state transition message indicating a new operating state to a downstream node 130. A technique for changing the operating state of a node 130 in response to receiving a state transition message transmitted by an upstream node 130 is discussed below in conjunction with FIG. 6.

Figure 6:
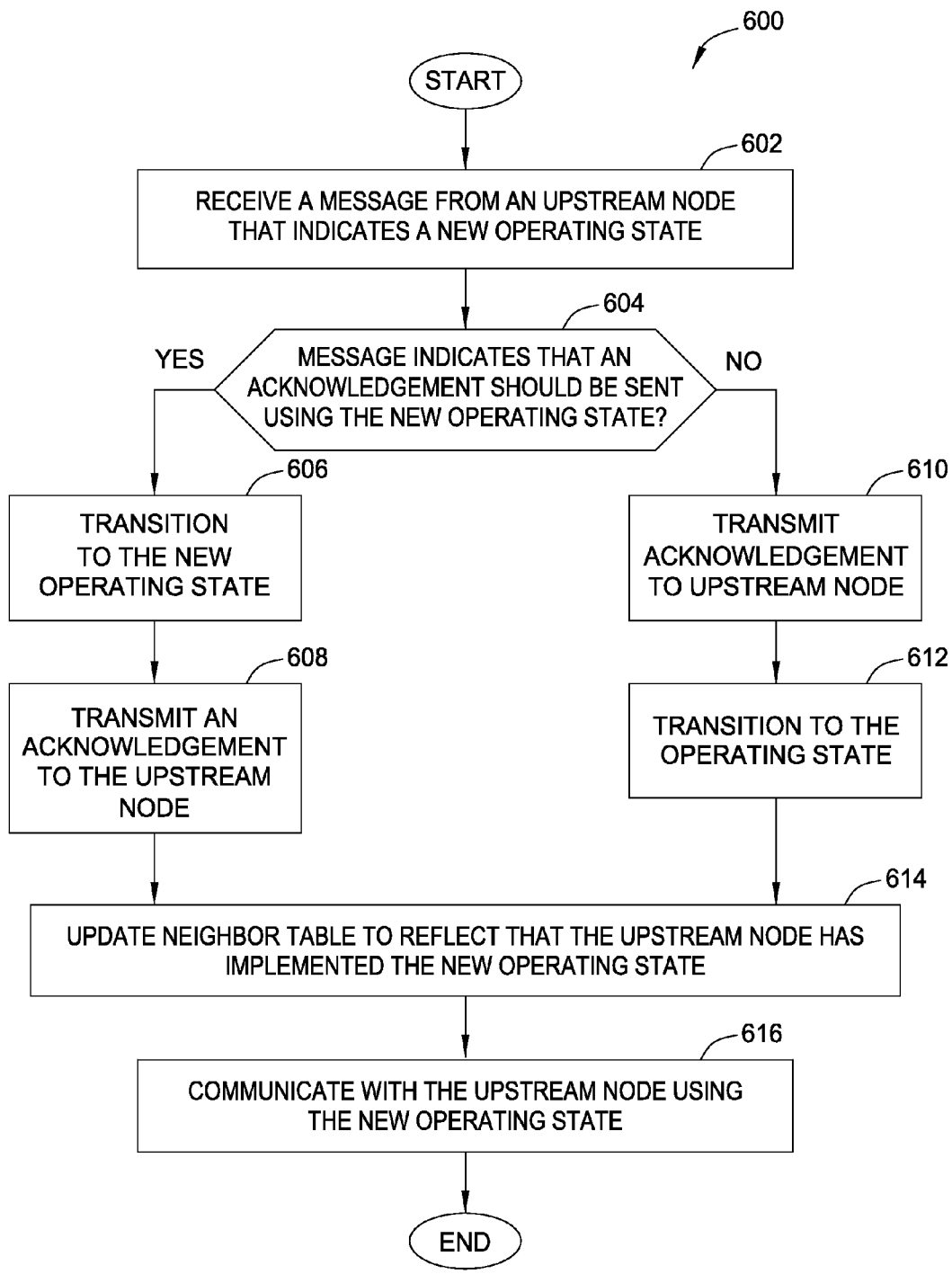
FIG. 6 is a flow diagram of method steps for changing the operating state of a node based on a message received from an upstream node, according to one embodiment of the invention.

FIG. 6 is a flow diagram of method steps for changing the operating state of a node 130 based on a message received from an upstream node 130, according to one embodiment of the invention. Although the method steps are described in conjunction with the systems of FIGS. 1-4, persons skilled in the art will understand that any system configured to perform the method steps, in any order, is within the scope of the present invention.

As shown, a method 600 begins at step 602, where node 130-4 receives a state transition message from node 130-5. The message could be, e.g., state transition message 302 shown in FIG. 3 or state transition message 402-4 shown in FIG. 4. The state transition message includes a set of operating parameters that represent the new operating state.

At step 604, node 130-4 determines whether the state transition message indicates that an acknowledgement message should be sent using the new operating state or sent using the current operating state of node 130-4. In one embodiment, the message includes a set of bits that represent an "acknowledgement message state." The acknowledgement message state indicates to node 130-4 whether, upon receipt of the state transition message, node 130-4 should transition to the new operating state and then transmit the acknowledgement message, or, alternatively, transmit the acknowledgement message first, and then transition to the new operating state.

At step 604, if node 130-4 determines that the state transition message indicates that the acknowledgement message should be sent using the new operating state, then the method 600 proceeds to step 606 where node 130-4 transitions to the new operating state. The new operating state reflects the operating parameters included within the state transition message received from node 130-5. At step 608, node 130-4 transmits the acknowledgement message to node 130-5. The method then proceeds to step 614.

At step 604, if node 130-4 determines that the state transition message indicates that the acknowledgement message should not be sent using the new operating state, then the method 600 proceeds to step 610 where node 130-4 transmits the acknowledgement message to node 130-5. At step 612, node 130-4 transitions to the new operating state. The new operating state reflects the operating parameters included within the state transition message received from node 130-5. The method then proceeds to step 614.

At step 614, node 130-4 updates a neighbor table included within node 130-4 to reflect that node 130-5 has implemented the new operating state reflected by the state transition message sent from that node. At step 616, node 130-4 communicates with node 130-5 using the new operating state. The method 600 then ends.

By implementing the method 600, node 130-4 is configured to determine the sequence with which node 130-4 should transition to the new operating state and transmit the acknowledgement message. Node 130-4 may then transition to the new operating state and transmit the acknowledgement message according to that sequence. Each of the methods 500 and 600 described above in conjunction with FIGS. 5 and 6 may be implemented by each of nodes 130 associated with wireless mesh network 102. By implementing the techniques described above, a given node 130 is capable of synchronizing operating states with other nodes 130 within that network.

In sum, a node residing within a wireless mesh network is configured to transmit a state transition message to a downstream node also residing within the wireless mesh network. The state transition message indicates a new operating state for the downstream node. Upon receipt of the state transition message, the downstream node may transition to the new operating state and then transmit an acknowledgement message back to the node that sent the state transition message. Alternatively, the downstream node may transmit the acknowledgement message back to the node that sent the state transition message first, and then transition to the new operating state.

Advantageously, nodes within the wireless mesh network are capable of synchronizing operating states amongst one another, thereby providing more reliable and robust communication pathways across the wireless mesh network.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i)

non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

The invention claimed is:

1. A computer-implemented method for causing a first node residing within a network to transition from a first operating state to a second operating state, the method comprising:
    receiving a first state transition message from a second node that is coupled to the first node and also resides within the network, wherein the state transition message indicates the second operating state;
    determining that the first state transition message indicates a first sequence with which the first node should transition from the first operating state to the second operating state and transmit a first acknowledgement message to the second node;
    causing the first node to transition from the first operating state to the second operating state based on a first set of operating parameters included within the first state transition message; and
    transmitting the first acknowledgement message to the second node indicating that the first state transition message was received by the first node according to the first sequence,
    wherein the first state transition message comprises a unicast frame transmitted within a media access control (MAC) layer associated with the network, and wherein the first set of operating parameters are included within a header information element (HIE) associated with the unicast frame.

2. The computer-implemented method of claim 1, further comprising:
    determining that a transition time has elapsed; and
    in response, updating a first neighbor table within the first node to reflect that the second node is also operating according to the second operating state.

3. The computer-implemented method of claim 1, wherein the first sequence indicates that the first node should transition from the first operating state to the second operating state prior to transmitting the first acknowledgement message to the second node.

4. The computer-implemented method of claim 1, wherein the first sequence indicates that the first node should transmit the first acknowledgement message to the second node prior to transitioning from the first operating state to the second operating state.

5. The computer-implemented method of claim 1, wherein the first set of operating parameters included within the first state transition message designate a particular operating mode, a particular frequency band, and a particular frequency associated with the second operating state.

6. The computer-implemented method of claim 5, wherein the first set of operating parameters included within the first state transition message further designate a particular time when the first node should transition from the first operating state to the second operating state, and a particular duration for which the first node should implement the second operating state.

7. A non-transitory computer-readable medium storing program instructions that, when executed by a processing unit, cause the processing unit to cause a first node residing within a network to transition from a first operating state to a second operating state, by performing the steps of:
    receiving a first state transition message from a second node that is coupled to the first node and also resides within the network, wherein the state transition message indicates the second operating state;
    determining that the first state transition message indicates a first sequence with which the first node should transition from the first operating state to the second operating state and transmit a first acknowledgement message to the second node;
    causing the first node to transition from the first operating state to the second operating state based on a first set of operating parameters included within the first state transition message; and
    transmitting the first acknowledgement message to the second node indicating that the first state transition message was received by the first node according to the first sequence,
    wherein the first state transition message comprises a unicast frame transmitted within a media access control (MAC) layer associated with the network, and wherein the first set of operating parameters are included within a header information element (HIE) associated with the unicast frame.

8. The non-transitory computer-readable medium of claim 7, further the steps of:
    determining that a transition time has elapsed; and
    in response, updating a first neighbor table within the first node to reflect that the second node is also operating according to the second operating state.

9. The non-transitory computer-readable medium of claim 7, wherein the first sequence indicates that the first node should transition from the first operating state to the second operating state prior to transmitting the first acknowledgement message to the second node.

10. The non-transitory computer-readable medium of claim 7, wherein the first sequence indicates that the first node should transmit the first acknowledgement message to the second node prior to transition ing from the first operating state to the second operating state.

11. The non-transitory computer-readable medium of claim 7, wherein the first set of operating parameters included within the first state transition message designate a particular operating mode, a particular frequency band, and a particular frequency associated with the second operating state.

12. The non-transitory computer-readable medium of claim 11, wherein the first set of operating parameters included within the first state transition message further designate a particular time when the first node should transition from the first operating state to the second operating state, and a particular duration for which the first node should implement the second operating state.

13. A computing device configured to cause a first node residing within a network to transition from a first operating state to a second operating state, including:
    a processing unit configured to:
        receive a first state transition message from a second node that is coupled to the first node and also resides within the network, wherein the state transition message indicates the second operating state;

determine that the first state transition message indicates a first sequence with which the first node should transition from the first operating state to the second operating state and transmit a first acknowledgement message to the second node;

cause the first node to transition from the first operating state to the second operating state based on a first set of operating parameters included within the first state transition message; and transmit the first acknowledgement message to the second node indicating that the first state transition message was received by the first node according to the first sequence, wherein the first state transition message comprises a unicast frame transmitted within a media access control (MAC) layer associated with the network and the first set of operating parameters are included within a header information element (HIE) associated with the unicast frame, or the first state transition message comprises a broadcast frame and the first set of operating parameters are included within a media access control (MAC) sub-layer management entity payload information element (PIE).

14. The computing device of claim 13, further including: a memory unit coupled to the processing unit and storing program instructions that, when executed by the processing unit, cause the processing unit to:

receive the first state transition message;

determine that the first state transition message indicates the first sequence;

cause the first node to transition from the first operating state to the second operating state; and transmit the first acknowledgement message to the second node.

15. The computing device of claim 13, wherein the processing unit is further configured to determine that a transition time has elapsed, and, in response, update a first neighbor table within the first node to reflect that the second node is also operating according to the second operating state.

16. A computer-implemented method for causing a first node residing within a network to transition from a first operating state to a second operating state, the method comprising:

receiving a first state transition message from a second node that is coupled to the first node and also resides within the network, wherein the state transition message indicates the second operating state;

determining that the first state transition message indicates a first sequence with which the first node should transition from the first operating state to the second operating state and transmit a first acknowledgement message to the second node;

causing the first node to transition from the first operating state to the second operating state based on a first set of operating parameters included within the first state transition message; and transmitting the first acknowledgement message to the second node indicating that the first state transition message was received by the first node according to the first sequence, wherein the first state transition message comprises a broadcast frame, and wherein the first set of operating parameters are included within a media access control (MAC) sub-layer management entity payload information element (PIE).

17. A computer-implemented method for causing a first node residing within a network to transition from a first operating state to a second operating state, the method comprising:

receiving a first state transition message from a second node that is coupled to the first node and also resides within the network, wherein the state transition message indicates the second operating state;

determining that the first state transition message indicates a first sequence with which the first node should transition from the first operating state to the second operating state and transmit a first acknowledgement message to the second node;

causing the first node to transition from the first operating state to the second operating state based on a first set of operating parameters included within the first state transition message; and transmitting the first acknowledgement message to the second node indicating that the first state transition message was received by the first node according to the first sequence, wherein the first set of operating parameters included within the first state transition message designate a particular operating mode, a particular frequency band, and a particular frequency associated with the second operating state.

18. A non-transitory computer-readable medium storing program instructions that, when executed by a processing unit, cause the processing unit to cause a first node residing within a network to transition from a first operating state to a second operating state, by performing the steps of:

receiving a first state transition message from a second node that is coupled to the first node and also resides within the network, wherein the state transition message indicates the second operating state;

determining that the first state transition message indicates a first sequence with which the first node should transition from the first operating state to the second operating state and transmit a first acknowledgement message to the second node;

causing the first node to transition from the first operating state to the second operating state based on a first set of operating parameters included within the first state transition message; and transmitting the first acknowledgement message to the second node indicating that the first state transition message was received by the first node according to the first sequence, wherein the first state transition message comprises a broadcast frame, and wherein the first set of operating parameters are included within a media access control (MAC) sub-layer management entity payload information element (PIE).

19. A non-transitory computer-readable medium storing program instructions that, when executed by a processing unit, cause the processing unit to cause a first node residing within a network to transition from a first operating state to a second operating state, by performing the steps of:

receiving a first state transition message from a second node that is coupled to the first node and also resides within the network, wherein the state transition message indicates the second operating state;

determining that the first state transition message indicates a first sequence with which the first node should transition from the first operating state to the second operating state and transmit a first acknowledgement message to the second node;

causing the first node to transition from the first operating state to the second operating state based on a first set of operating parameters included within the first state transition message; and transmitting the first acknowledgement message to the second node indicating that the first state transition message was received by the first node according to the first sequence, wherein the first set of operating parameters included within the first state transition message designate a particular operating mode, a particular frequency band, and a particular frequency associated with the second operating state.

\* \* \* \* \*